United States Patent [19]

Moring et al.

[11] 4,030,575
[45] June 21, 1977

[54] PISTON ASSEMBLY WITH SAFETY VENT MEANS FOR BRAKES AND THE LIKE

[75] Inventors: Rodger L. Moring, Bristol; Richard E. Frauenhoff, Montgomery, both of Ill.

[73] Assignee: Caterpillar Tractor Co., Peoria, Ill.

[22] Filed: Oct. 22, 1975

[21] Appl. No.: 624,792

[52] U.S. Cl. .......................... 188/71.1; 188/151 A; 188/170; 188/352; 192/91 A
[51] Int. Cl.² ........................................ B60T 11/30
[58] Field of Search .............. 188/71.1, 72.3, 72.4, 188/151 A, 170, 352; 192/91 A; 92/128; 305/10; 303/6 M

[56]  References Cited
UNITED STATES PATENTS

| | | | |
|---|---|---|---|
| 2,698,676 | 1/1955 | Eason | 192/91 A |
| 3,507,373 | 4/1970 | Kraft | 192/91 A |
| 3,526,302 | 9/1970 | Grant et al. | 188/170 |
| 3,536,230 | 10/1970 | Williams | 188/170 |
| 3,581,908 | 6/1971 | Pearson et al. | 188/170 |
| 3,792,910 | 2/1974 | Kaufman et al. | 305/10 |
| 3,831,718 | 8/1974 | Muller et al. | 188/170 |
| 3,915,433 | 10/1975 | Therkildsen | 192/91 A |

*Primary Examiner*—Trygve M. Blix
*Assistant Examiner*—Edward R. Kazenske
*Attorney, Agent, or Firm*—Phillips, Moore, Weissenberger, Lempio & Majestic

[57]  ABSTRACT

A brake assembly comprises a housing having a piston assembly reciprocally mounted thereon to selectively release the normally "on" brake assembly upon pressurization of an actuating chamber defined therein. The piston assembly comprises an annular piston having an opening formed therethrough to communicate with the actuating chamber. An annular pressure plate is releasably attached to the piston by a plurality of circumferentially disposed bolts. A cover plate is detachably mounted on an outboard side of the piston to normally cover and seal the opening formed therethrough and to further cover at least one of the bolts whereby the cover must be detached from the piston prior to releasing the bolt covered thereby.

18 Claims, 4 Drawing Figures

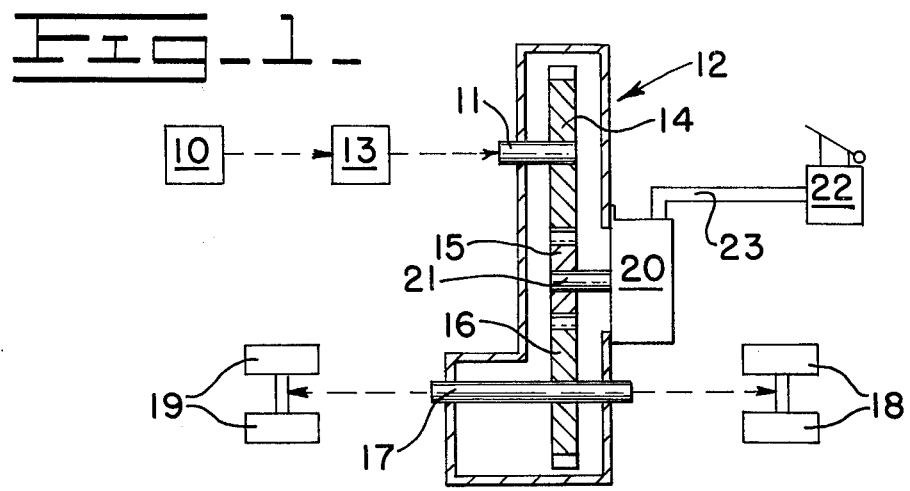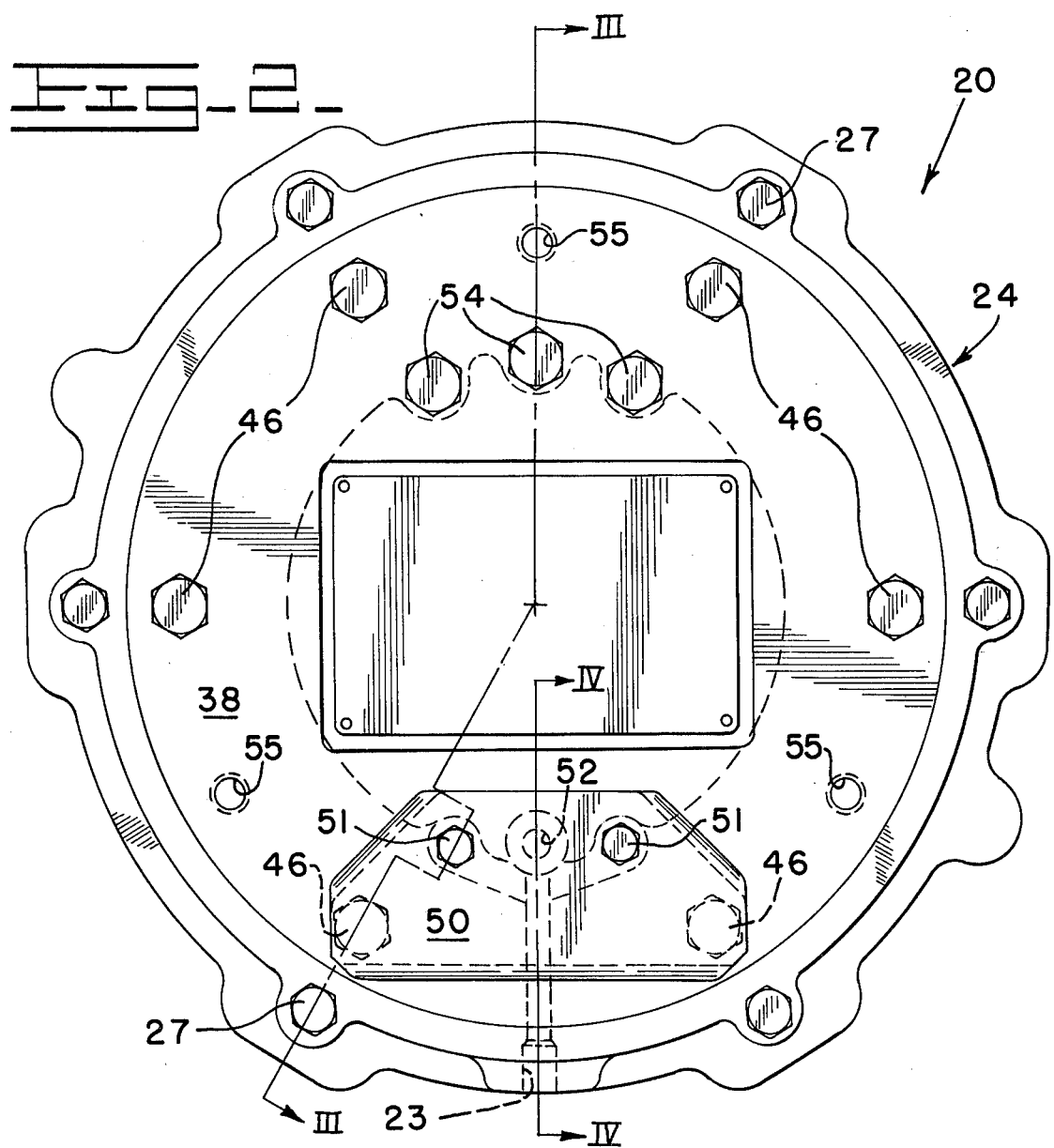

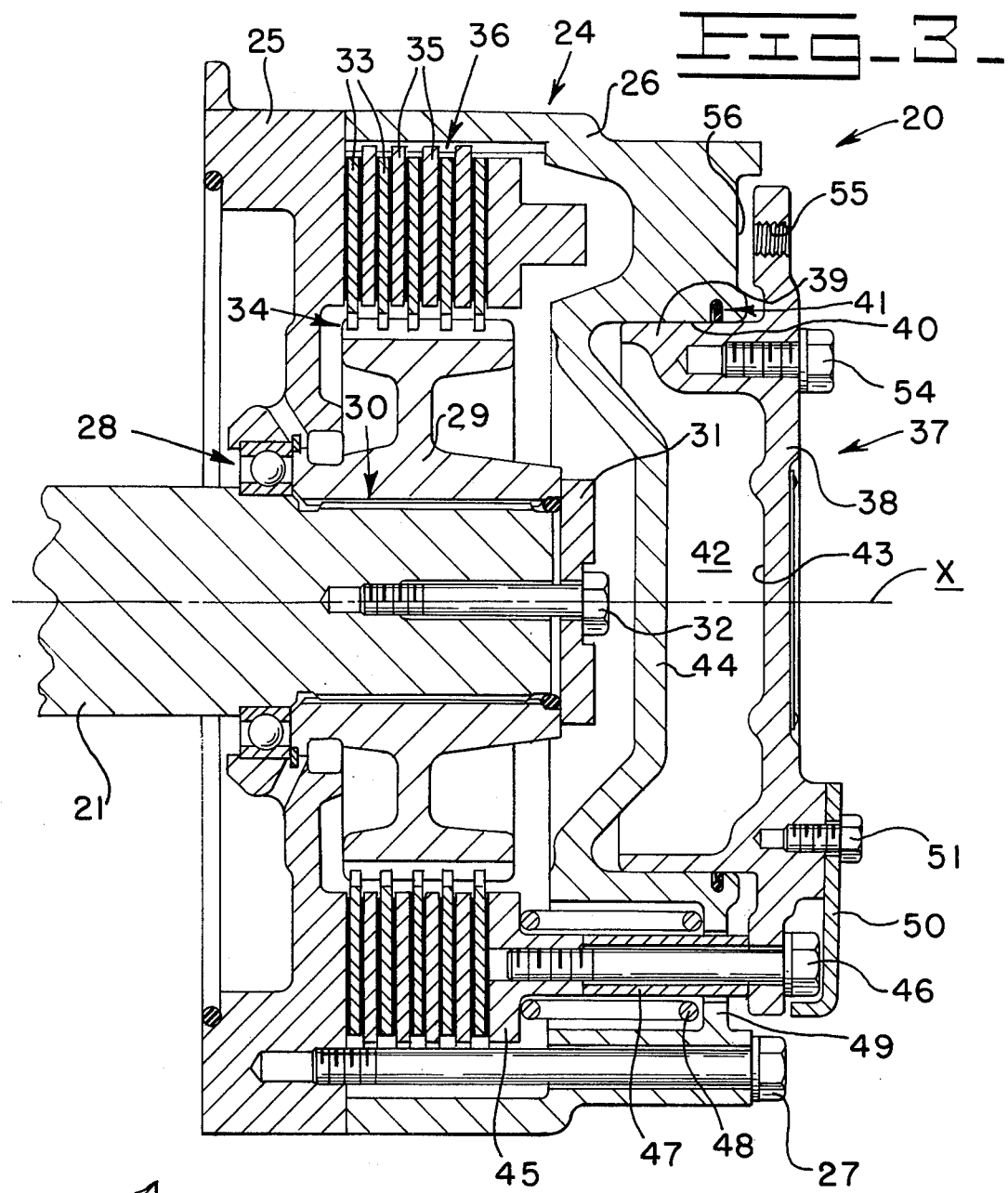
Fig_3_
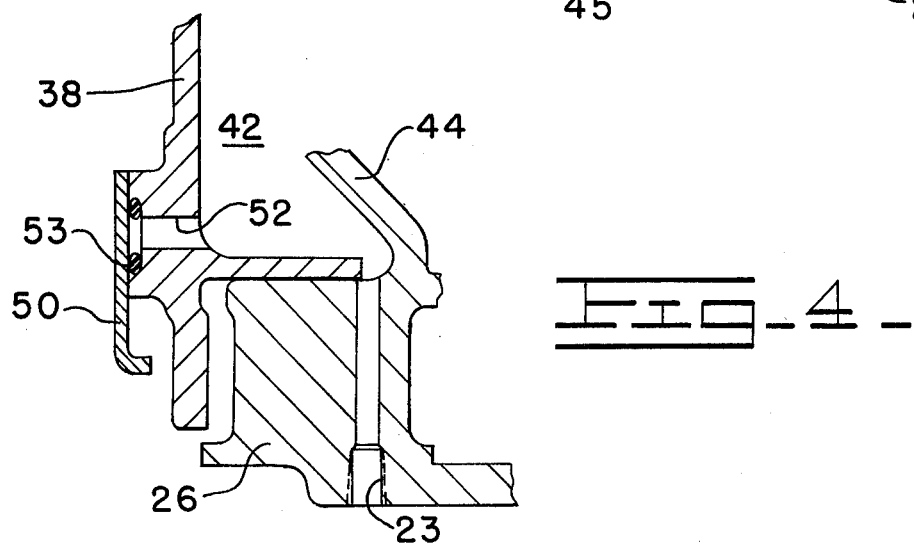
Fig_4_

4,030,575

PISTON ASSEMBLY WITH SAFETY VENT MEANS FOR BRAKES AND THE LIKE

BACKGROUND OF THE INVENTION

This invention relates to a piston assembly adapted for use in brakes or clutches. A conventional brake of the axially engaging type comprises a member rotatably mounted in a housing and a plurality of interleaved friction discs alternately mounted for limited axial movement on the member and on the housing and adapted to be compressed together to brake the member relative to the housing. The brake is normally held in its "on" condition of operation by a plurality of coil springs which urge an annular pressure plate against the friction discs to compress them together. An actuating chamber is defined in the brake whereby pressurization thereof will reciprocate a piston to disengage the pressure plate from the friction discs to permit the member to rotate relative to the housing.

In many such brakes, care must be taken to depressurize the actuating chamber prior to disassembly of the brake. Conventional brakes normally comprise a cap screw which normally closes a bleed orifice for relieving the air pressure in the actuating chamber upon removal of the cap screw. A typical bleeding arrangement is disclosed in U.S. Pat. No. 3,526,302, assigned to the assignee of this application.

SUMMARY OF THIS INVENTION

This invention relates to a non-complex and improved piston assembly for use in a brake or clutch and further adapted to be assembled and disassembled expeditiously and safely. The piston assembly comprises an annular piston having an annular pressure plate attached thereto by a plurality of releasable fastening means, such as bolts. A cover is detachably mounted on an outboard side of the piston to normally cover and seal an opening formed therethrough and to also at least partially cover at least one of the bolts. Thus, the cover must be detached from the piston prior to release of the bolt to automatically vent an actuating chamber normally defined between the piston and a housing on which the piston is reciprocally mounted.

BRIEF DESCRIPTION OF THE DRAWINGS

Other objects of this invention will become apparent from the following description and accompanying drawings wherein:

FIG. 1 is a sectional view through a transfer gear mechanism and further schematically illustrating such mechanism employed in a drive train of a vehicle;

FIG. 2 is an end elevational view of the brake assembly employed in conjunction with the transfer gear mechanism; and FIGS. 3 and 4 are sectional views taken in the direction of arrows III—III and IV—IV in FIG. 2, respectively.

DETAILED DESCRIPTION

FIG. 1 illustrates a drive train for a construction vehicle, such as a wheel loader, wherein an internal combustion engine 10 is adapted to drive an input shaft 11 of a transfer gear mechanism 12 via a standard transmission 13. The input shaft will thus rotate a first spur gear 14 to drive second and third spur gears 15 and 16, the latter gear in turn rotating an output shaft 17. The output shaft is suitably connected by standard drive lines to pairs of front and rear road wheels 18 and 19, respectively.

A brake assembly 20 has an input shaft 21 thereof secured to intermediate gear 15. The normally "on" brake assembly is adapted to be released by suitable actuation of a valve or air valve means 22 by the vehicle's operator which communicates pressurized air to the brake assembly via a conduit 23. It should be understood that although the hereinafter described invention specifically relates to a brake assembly, that such invention is equally applicable to a clutch assembly wherein valve 22 would be employed to couple a pair of rotating members to each other rather than connecting a rotating member to a stationary member.

Referring to FIGS. 2–4, the brake assembly further comprises a multi-part housing 24 including an annular first part 25 and a cup-shaped second part 26 releasably attached together by a plurality of circumferentially disposed bolts 27. Shaft 21 is rotatably mounted on part 25 of the housing by annular bearing means 28, preferably comprising a standard roller bearing assembly. An annular member 29 is releasably connected to an end of shaft 21 by a spline connection 30 and retained thereon by a plate 31 and a bolt 32.

A first set of annular friction discs 33 have their inner ends mounted on the periphery of member 29 at a spline connection 34. A second set of annular friction discs 35 are interleaved with the first set of friction discs and have their outer ends suitably splined at 36 on part 26 of housing 24. The friction discs are thus adapted for limited axial movement to be compressed together to normally brake shaft 21 relative to the housing.

The brake assembly further comprises a piston assembly 37 including an annular piston 38 having an annular boss 39 integrally formed on an inboard side thereof. The boss is slidably mounted in a like-shaped bore 40 defined on an outboard side of part 26 of housing 24. An annular static sealing means 41 is mounted on the housing to seal an actuating chamber 42 partially defined by an annular cavity 43 formed internally on an inboard side of piston 38 and an annular wall 44 of the housing.

The piston assembly further comprises an annular pressure plate 45 disposed in axial alignment and opposition with respect to the piston and threadably attached thereto by a plurality of fastening means or bolts 46 extending through the piston. A spacer 47 is mounted on each of the bolts and is disposed axially between the piston and pressure plate in abutting relationship therebetween. Spring means for normally biasing pressure plate 45 against friction discs 33 and 35 to engage the brake in its normally "on" condition of operation preferably comprises a coil spring 48 disposed on each bolt 46 and spacer 47 to abut an annular flange 49, formed integrally with part 26 of the housing, and pressure plate 45.

A cover means preferably in the form of a substantially flat plate 50 is detachably mounted on an outboard side of piston 38 by a pair of cap screws 51. As shown in FIG. 4, the cover means is disposed on the piston to cover an opening or bleed orifice 52 formed therethrough and sealed by an O-ring seal 53 compressed between the cover means and the piston. In addition, the cover means at least partially covers at least one of fastening means 46, releasably attaching the piston to the pressure plate, and has an end portion bent inwardly towards the piston to fully cover the fastening means. In the embodiment illustrated, two such fastening means are covered whereby the cover means must be detached from the piston prior to release of such fastening means.

Three jack screws 54 are threadably mounted in a storage position on an outboard side of piston 38. The jack screws are each adapted to be threadably mounted in a respective threaded hole 55 formed through a radial flange of the piston, to disable the brake should pressurized air become unavailable for actuating chamber 43. In particular, threading-down of the jack screws in circumferentially disposed holes 55 will engage the ends thereof with an annular bearing surface 56 of housing 24 exposed by such holes (FIG. 3) to retract the piston to thus release the brake.

In operation, actuating chamber 42 is normally exhausted of air via valve 22 to permit springs 48 to urge pressure plate 45 against friction discs 33 and 35 to compress them to prevent rotation of shaft 21 relative to housing 24. When the operator chooses to move the vehicle, valve 22 is actuated to communicate pressurized air to actuating chamber 42 whereby piston 38 moves rightwardly in FIG. 3 to release shaft 21 relative to the housing. Thus, transfer gear mechanism 12 will function to connect transmission 13 with roadwheels 18 and 19 to permit the operator to move the vehicle in a conventional manner.

When it is desired to service the brake assembly for repair or replacement purposes, a workman is fully protected against any potential injury in that actuating chamber 42 will be depressurized automatically even though the exposed bolts 46 shown in FIG. 2 are removed. In particular, in order to remove the remaining two bolts covered by cover means 50, cap screws 51 must be released to thus automatically vent the actuating chamber via opening 52. The latter two bolts can thus be removed to remove the piston assembly from the housing.

We claim:

1. A piston assembly adapted for use in a brake or clutch comprising
   a piston having an opening formed therethrough,
   a pressure plate disposed in axial alignment with respect to said piston,
   a plurality of fastening means releasably attaching said piston to said pressure plate, and
   cover means comprising a substantially flat plate detachably mounted directly on an outboard side of said piston and disposed thereon to cover said opening in sealing relationship therewith and having an end portion extending inwardly towards said piston to fully cover at least one of said fastening means whereby said cover means must be detached from said piston prior to release of the fastening means covered thereby.

2. The piston assembly of claim 1 wherein said piston further comprises an annular boss formed integrally on an inboard side thereof to define an annular cavity adapted to partially define an actuating chamber.

3. The piston assembly of claim 1 wherein each of said piston and said pressure plate are annular.

4. The piston assembly of claim 1 wherein each of said fastening means comprises a bolt extending through said piston and threadably mounted in said pressure plate.

5. The piston assembly of claim 4 further comprising an annular spacer mounted on each of said bolts and disposed axially between said piston and said pressure plate in abutting relationship therebetween.

6. The piston assembly of claim 1 wherein said plate covers a pair of said fastening means.

7. A vehicle having a brake assembly comprising a housing having a piston assembly reciprocally mounted therein, said piston assembly comprising
   a piston having an opening formed therethrough,
   a pressure plate disposed in axial alignment with respect to said piston,
   a plurality of fastening means releasably attaching said piston to said pressure plate, and
   cover means comprising a substantially flat plate detachably mounted directly on an outboard side of said piston and disposed thereon to cover said opening in sealing relationship therewith and having an end portion extending inwardly towards said piston to fully cover at least one of said fastening means whereby said cover means must be detached from said piston prior to release of the fastening means covered thereby.

8. The vehicle of claim 7 wherein said brake assembly further comprises an input shaft rotatably mounted in said housing, a member secured to an end of said shaft for simultaneous rotation therewith, a first set of annular friction discs having inner ends thereof splined on the periphery of said member for limited axial movement thereon and a second set of friction discs having outer ends thereof splined internally on said housing for limited axial movement thereon and interleaved with said first set of friction discs and wherein said pressure plate is disposed in axial opposition to said first and second friction discs for selectively compressing them together to prevent rotation of said shaft relative to said housing.

9. The vehicle of claim 8 wherein said brake assembly further comprising spring means disposed between said housing and said pressure plate for normally biasing said pressure plate against said first and second sets of friction discs to compress them together to normally prevent rotation of said shaft relative to said housing.

10. The vehicle of claim 9 wherein said brake assembly further comprising means defining an annular actuating chamber between said housing and said piston adapted to be pressurized to move said piston axially away from said housing to release said pressure plate from said friction discs.

11. The vehicle of claim 10 wherein said piston has an annular boss formed integrally on an inboard side thereof to partially define said actuating chamber, said boss slidably mounted in an annular bore formed on an outboard side of said housing.

12. The vehicle of claim 11 wherein said brake assembly further comprising annular sealing means disposed between said housing and said boss for sealing said actuating chamber.

13. The vehicle of claim 11 wherein said brake assembly further comprising air valve means for selectively communicating pressurized air via a conduit to said actuating chamber.

14. The vehicle of claim 7 further comprising a transfer gear mechanism operatively connected to said brake assembly and means for normally engaging said brake assembly for preventing actuation of said transfer gear mechanism.

15. The vehicle of claim 14 wherein said transfer gear mechanism comprises a plurality of intermeshing spur gears with an input shaft to said brake assembly secured to an intermediate one of said spur gears for simultaneous rotation therewith.

16. The vehicle of claim 15 wherein another one of said spur gears is secured to an input shaft to said transfer gear mechanism for simultaneous rotation therewith and wherein said last mentioned input shaft is operatively connected to a transmission of said vehicle.

17. The vehicle of claim 16 wherein still another one of said spur gears is secured to an output shaft from said transfer gear mechanism for simultaneous rotation therewith and wherein said output shaft is operatively connected to roadwheels of said vehicle.

18. The vehicle of claim 7 wherein said brake assembly further comprising a plurality of jack screw means mounted in a storage position on an outboard side of said piston and a plurality of threaded holes formed through piston to expose a bearing surface formed on said housing whereby threading-down of said jack screw means in said holes will retract said piston relative to said housing.

* * * * *